June 7, 1966  R. J. BAUNACH  3,254,800
AUTOMATIC CORN POPPING MACHINE
Filed Jan. 11, 1965  9 Sheets-Sheet 1

INVENTOR.
ROY J. BAUNACH
BY Owen & Owen
ATTORNEYS

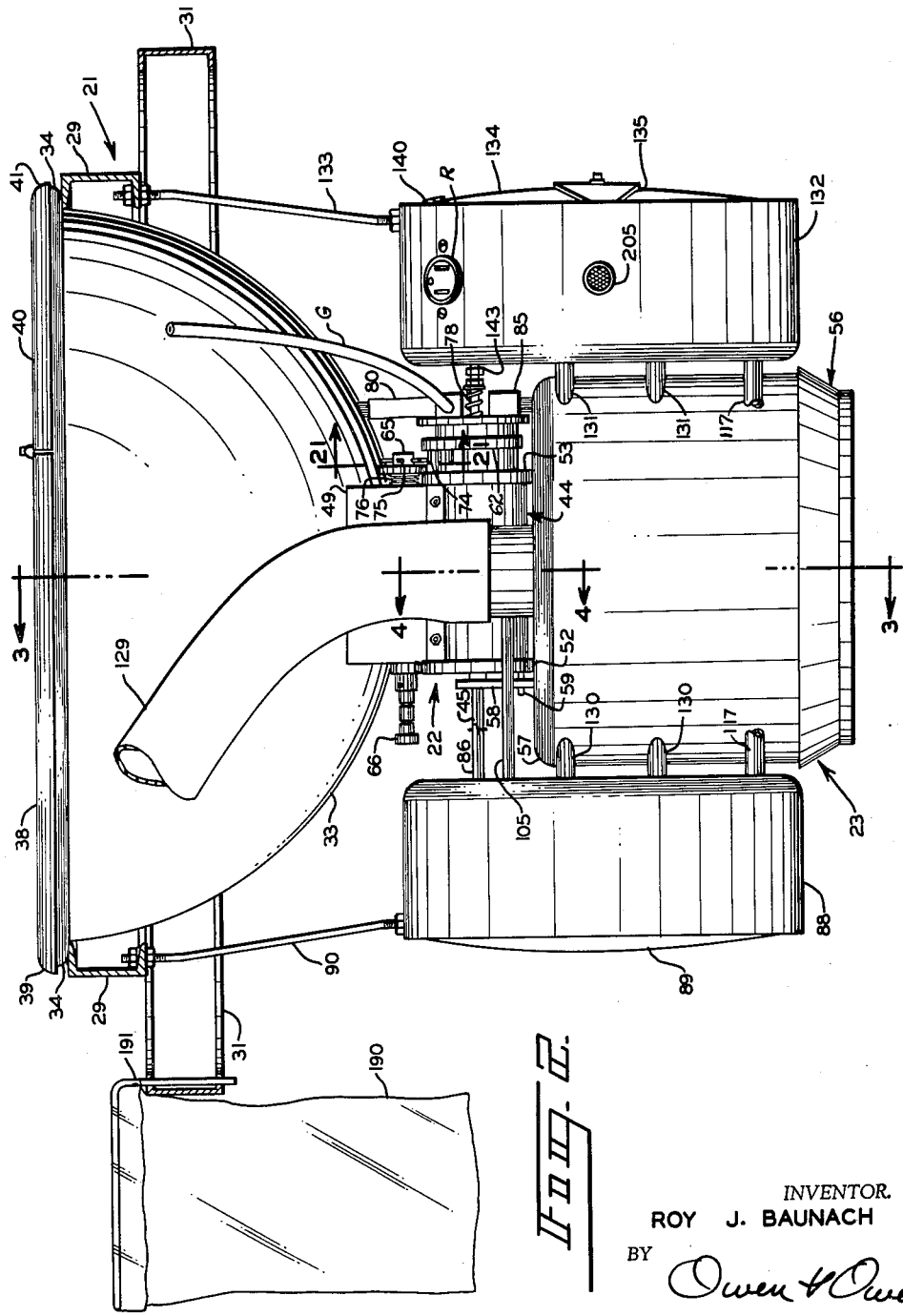

June 7, 1966  R. J. BAUNACH  3,254,800
AUTOMATIC CORN POPPING MACHINE
Filed Jan. 11, 1965  9 Sheets-Sheet 3
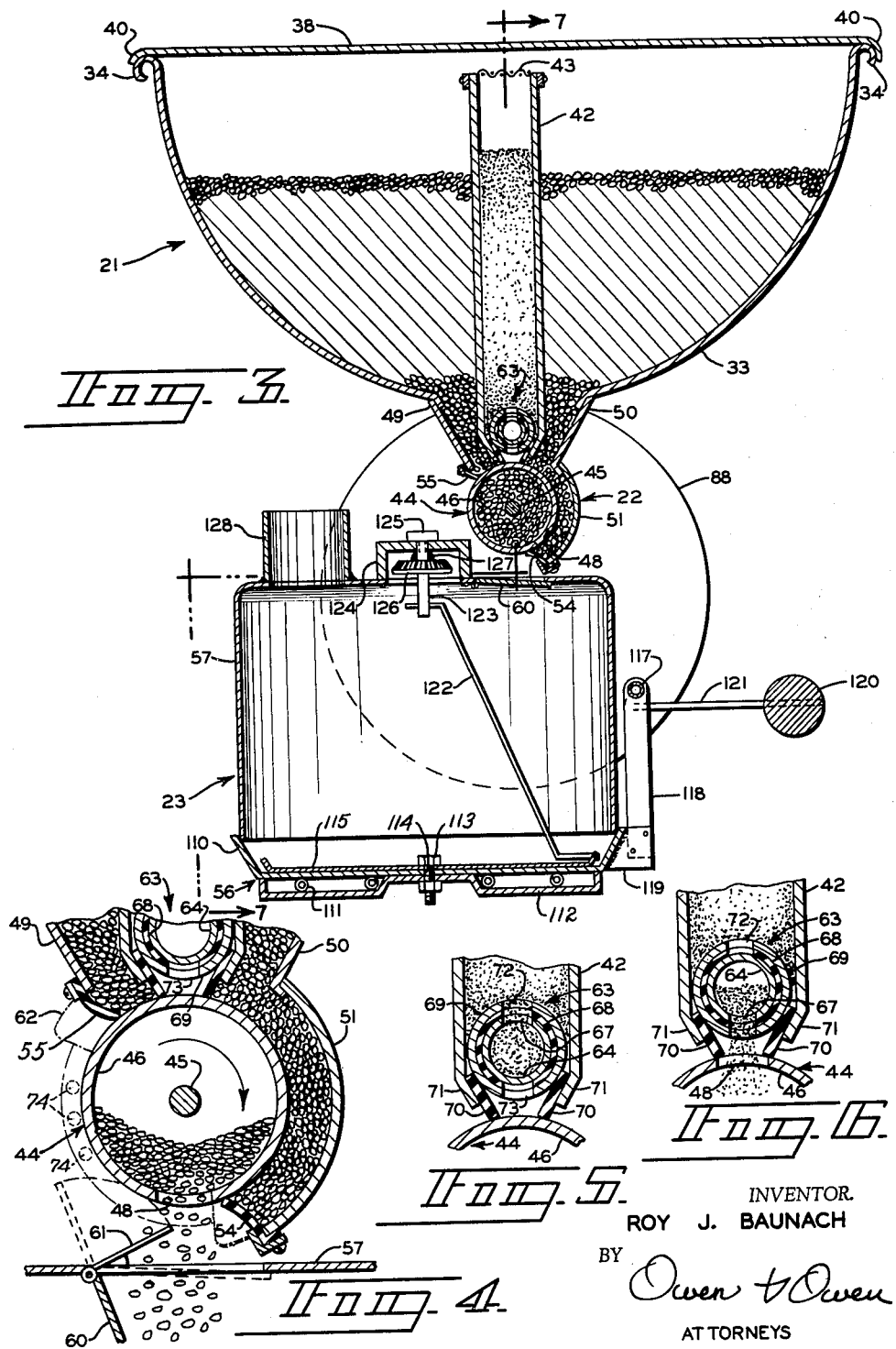
INVENTOR.
ROY J. BAUNACH
BY Owen & Owen
ATTORNEYS

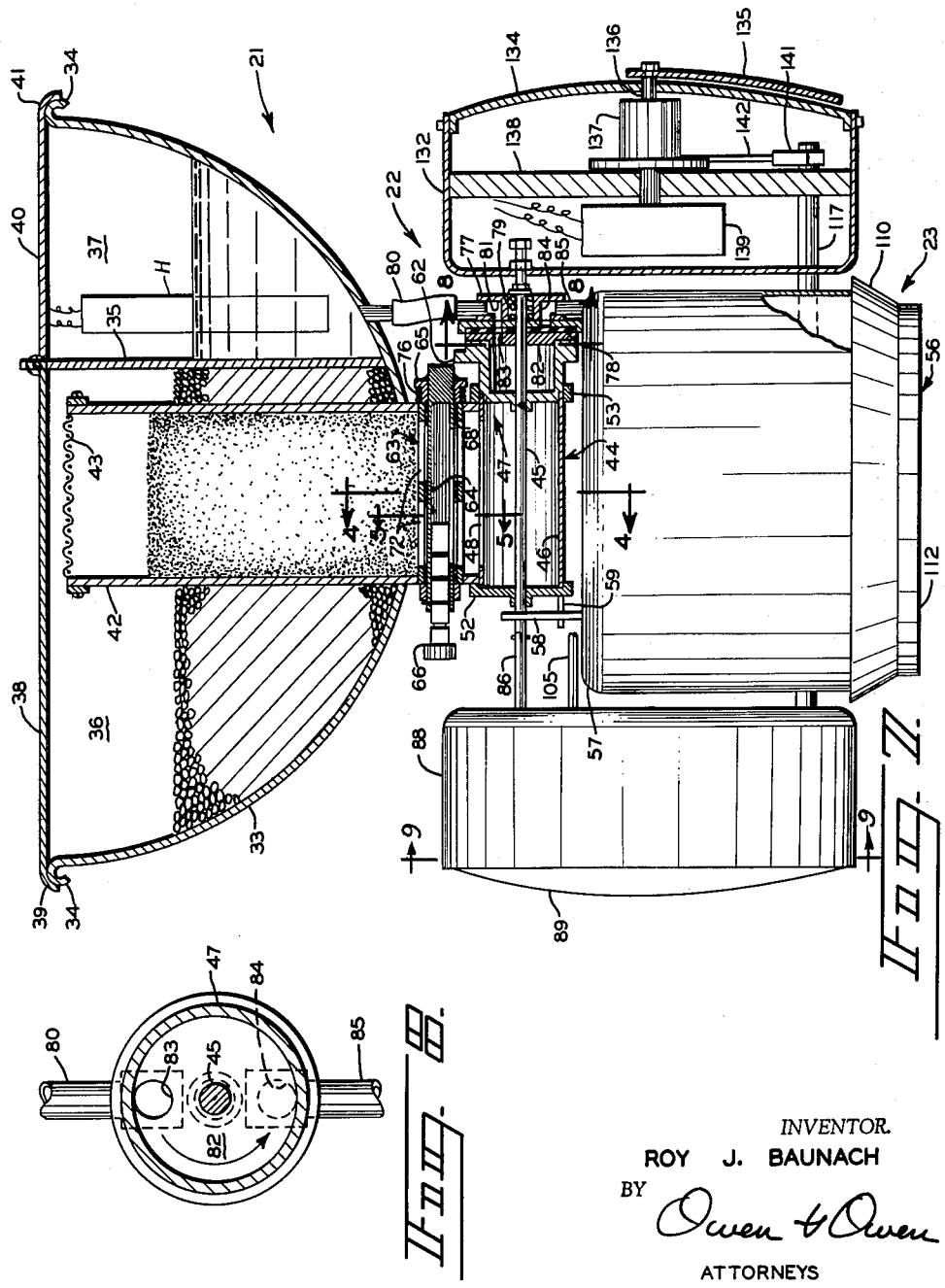

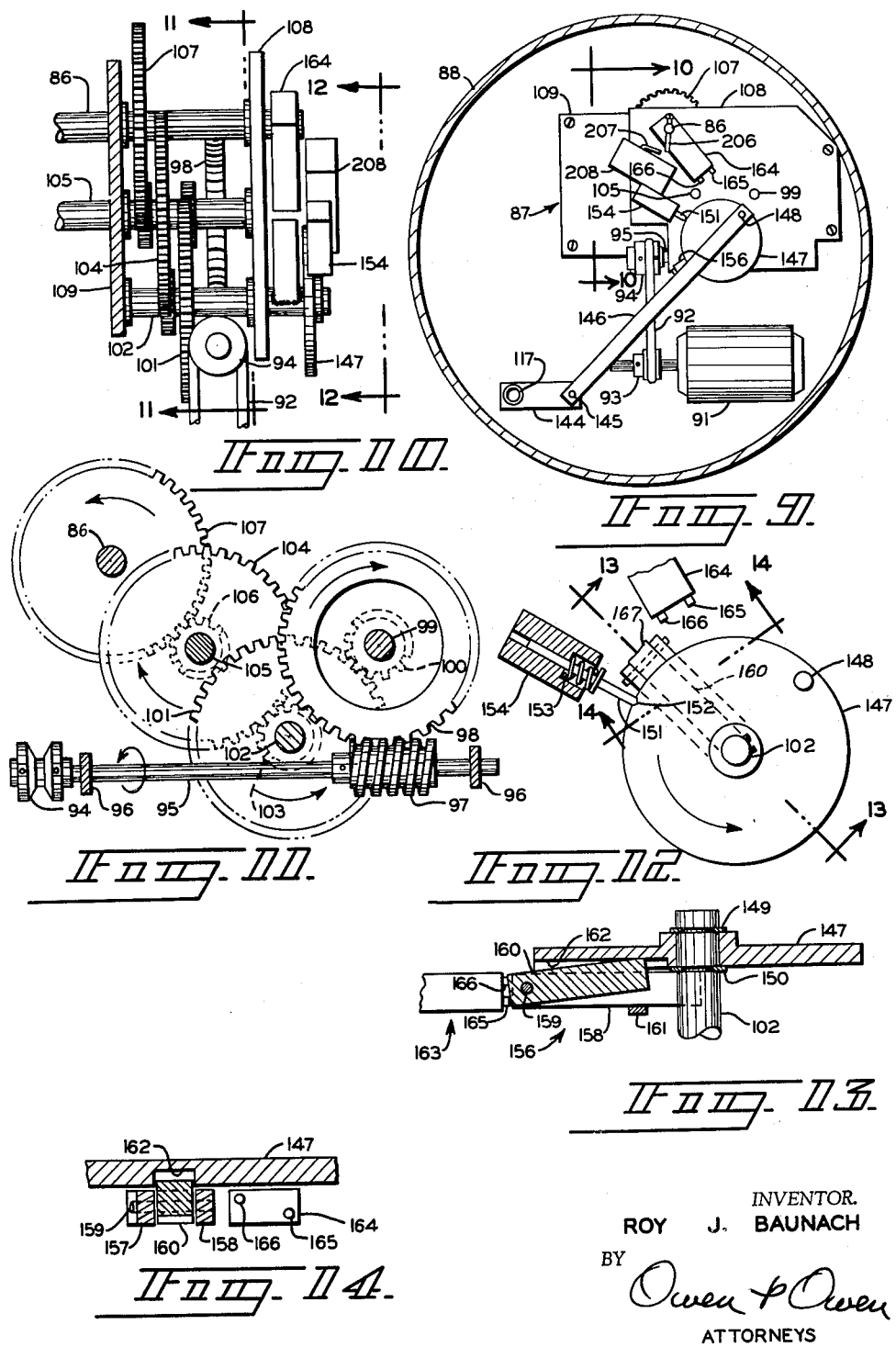

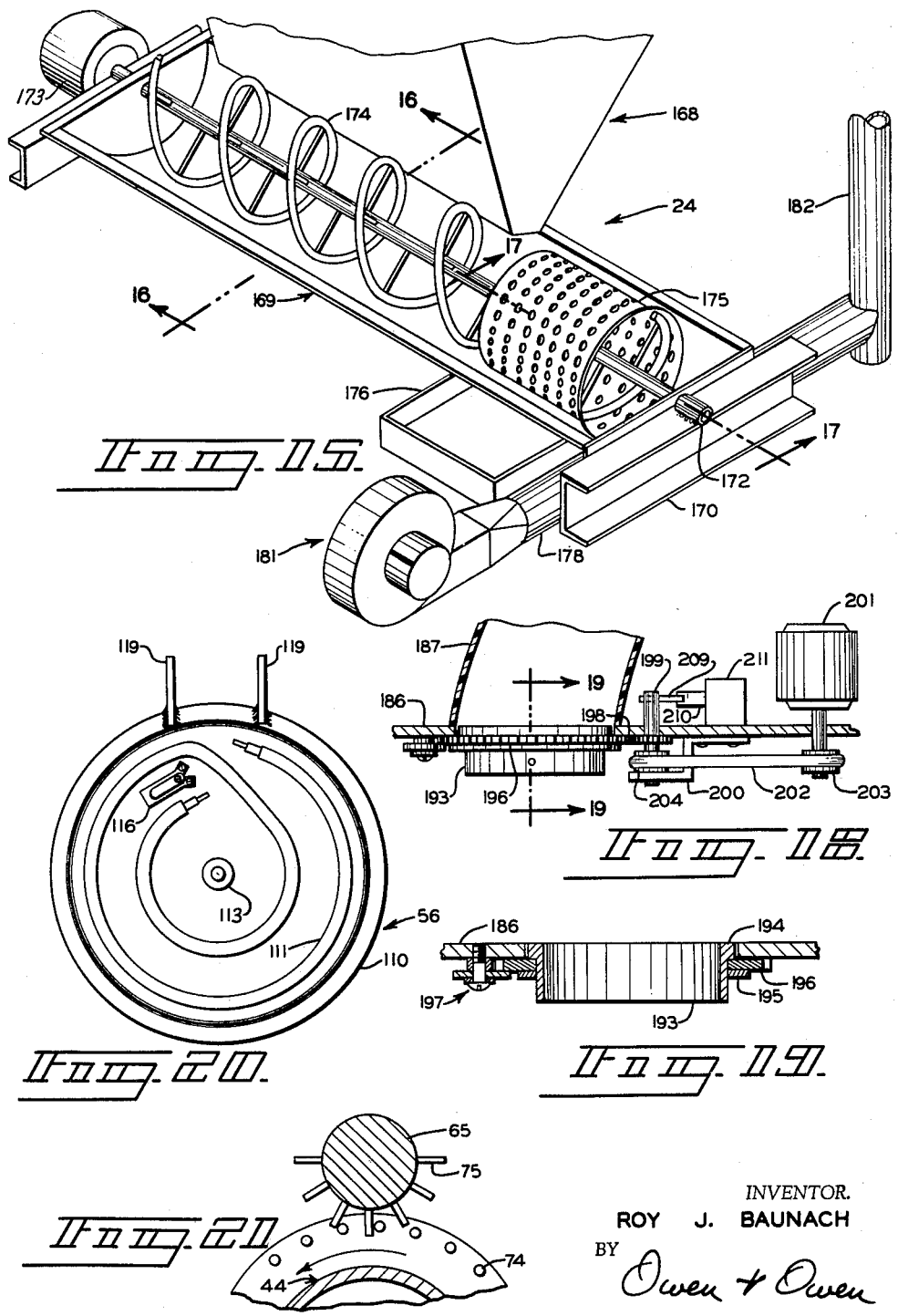

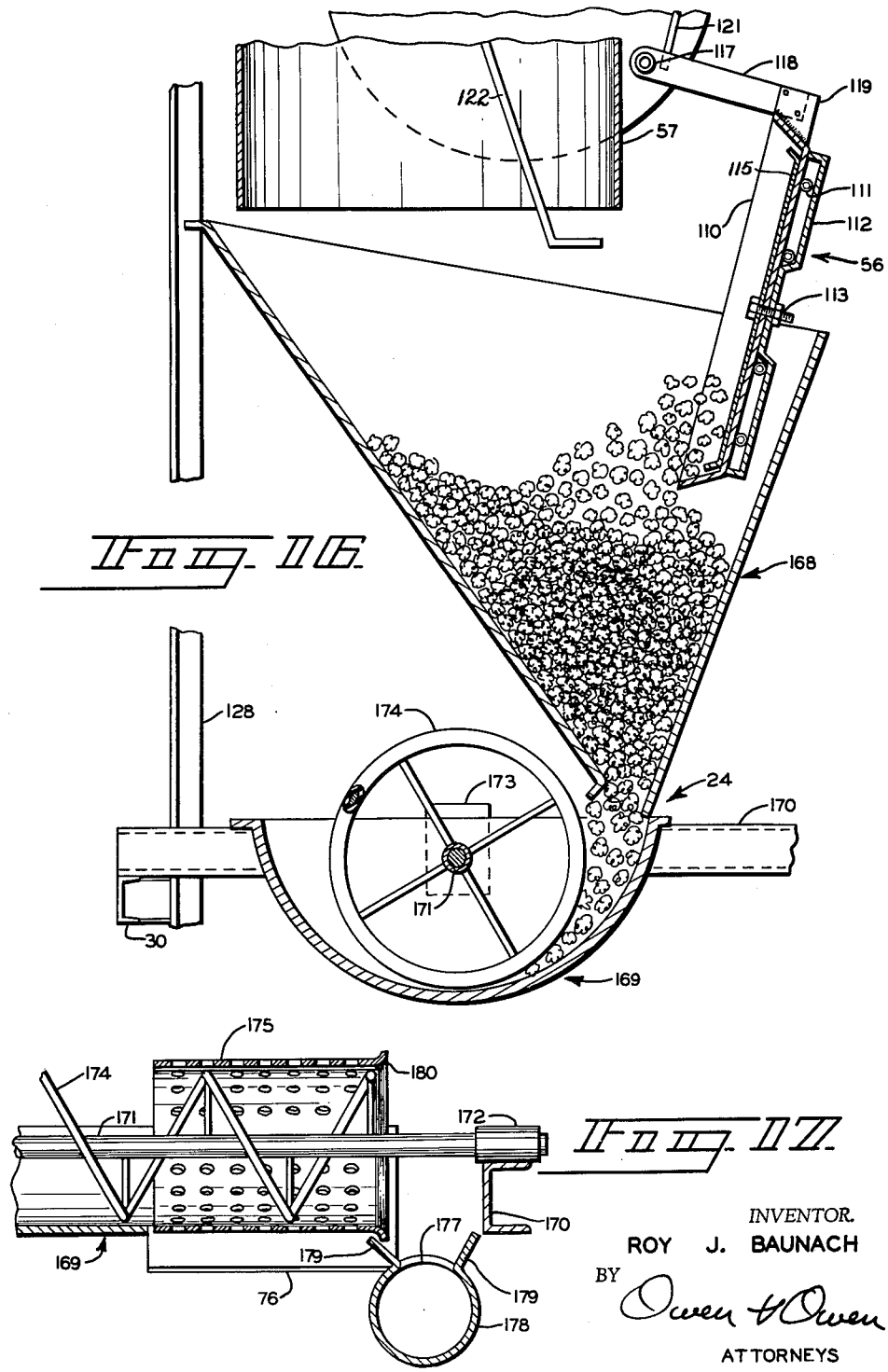

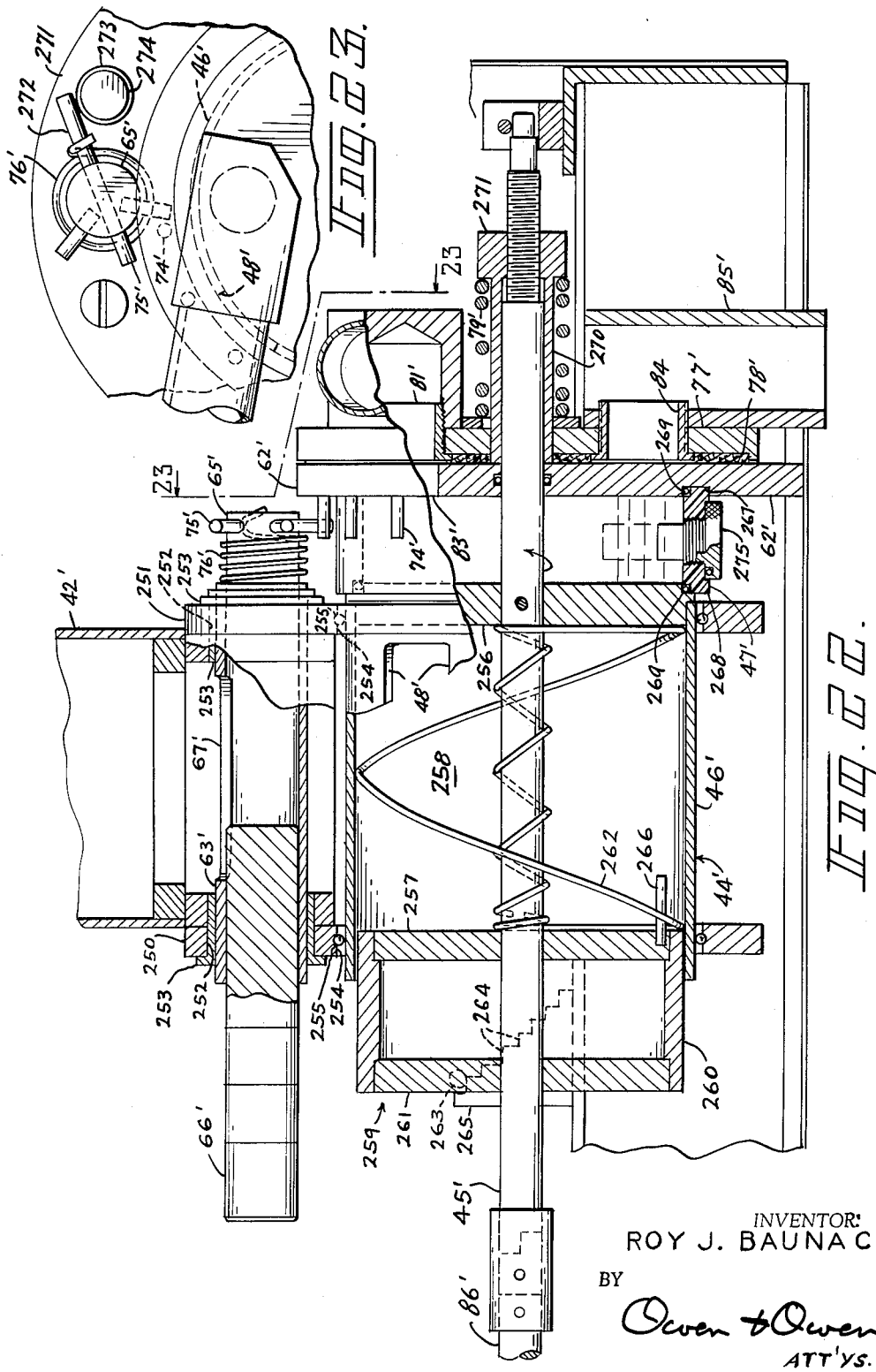

United States Patent Office 3,254,800
Patented June 7, 1966

3,254,800
AUTOMATIC CORN POPPING MACHINE
Roy J. Baunach, Toledo, Ohio, assignor to Electroware Corporation, Toledo, Ohio, a corporation of Ohio
Filed Jan. 11, 1965, Ser. No. 424,617
14 Claims. (Cl. 222—132)

The present application is a continuation-in-part of my copending application, Serial No. 107,796, filed May 4, 1961, now Patent No. 3,209,672.

This invention relates to an automatic corn popping machine of the type for use in establishments such as theaters, places of public recreation such as zoos and parks and other places where large volumes of popcorn are sold during the course of a day.

Many large size, commercial corn popping machines have been designed but most of them consist merely in heated pans of large capacity into which an operator must measure the charges of raw popcorn, butter or oil and salt. Most commercial machines are merely larger versions of the old fashioned home popping skillet and each charge of popcorn requires a substantial amount of manual attention by an operator in order to insure its proper preparation.

It is an object of the instant invention to provide a large capacity corn popping machine which is entirely automatic in operation, which measures charges of raw popcorn, salt, and oil, meters these charges into a popping skillet and discharges the popped corn from the skillet when it is popped to proper condition, then restoring itself and recycling to repeat the automatic operation as desired.

It is yet another object of the instant invention to provide an automatic corn popping machine which can be loaded with a large quantity of the popcorn, of popping oil and salt and which meters all three of these ingredients into the popping skillet for each individual charge, discharging the popped corn therefrom when ready and repeating the metering and popping cycle as long as is desired.

An object of the present invention is the provision of a new and improved corn popping machine which automatically and sequentially fills containers.

Another object of the invention is the provision of a new and improved valve for metering corn and salt to a skillet and which substantially compeltely eliminates water vapor liberated in the skillet from condensing in the metering apparatus and caking the salt and thereby decreasing the amounts of products delivered to the skillet.

A further object of the invention is the provision of a new and improved valve of the above described type which also meters oil to the skillet without employing a pump.

A still further object of the invention is the provision of a new and improved valve of the above described type wherein the proportions of the salt, oil and corn to be popped can be varied.

It is yet another object of the instant invention to provide an automatic corn popping machine which is relatively simple in construction, may be readily disassembled for cleaning and which frees the operator completely from the necessity of spending any of his time in connection with the popping of the corn, allowing him to concentrate upon its sale.

These and other more specific objects and advantages of an automatic corn popping machine embodying the invention will be better understood from the specification which follows and from the drawings in which:

FIG. 2 is a view in elevation of the upper portion of an automatic corn popping machine embodying the invention, and shown on an enlarged scale;

FIG. 3 is a vertical sectional view taken along the line 3—3 of FIG. 2;

FIG. 4 is a fragmentary detailed view in vertical section, of a portion of the popcorn metering and discharging mechanism of a machine embodying the invention, taken along the line 4—4 of FIG. 2 and shown on an enlarged scale; the section also being indicated by the line 4—4 of FIG. 7; and has significant camming portions which lie above the plane of the figure shown in dot-dash lines;

FIG. 5 is a fragmentary, vertical sectional view of a salt metering mechanism in one position of its operation, the section being indicated by the line 5—5 of FIG. 7;

FIG. 6 is a view similar to FIG. 5 but showing the salt metering mechanism at another position in its operation;

FIG. 7 is a part vertical sectional view with parts broken away, taken along the line 7—7 of FIG. 3;

FIG. 8 is a fragmentary vertical sectional view on an enlarged scale taken from the position indicated by the line 8—8 of FIG. 7;

FIG. 9 is a fragmentary view in elevation, taken generally from the position indicated by the line 9—9 of FIG. 7;

FIG. 10 is a fragmentary vertical sectional view taken from the position indicated by the line 10—10 in FIG. 9;

FIG. 11 is a fragmentary view in elevation on an enlarged scale, taken generally from the position indicated by the line 11—11 of FIG. 10;

FIG. 12 is a fragmentary, vertical sectional view, on an enlarged scale, taken along the line 12—12 of FIG. 10;

FIG. 13 is a sectional view taken along the line 13—13 of FIG. 12;

FIG. 14 is a sectional view taken along the line 14—14 in FIG. 12;

FIG. 15 is a view in perspective of the lower portion of a corn popping machine embodying the invention showing the delivery section thereof including the means for conveying the corn after it is popped;

FIG. 16 is an enlarged, vertical sectional view of the lower portion of a corn popping machine embodying the invention taken from a position indicated by the line 16—16 in FIG. 15;

FIG. 17 is a fragmentary, axial sectional view taken from the position indicated by the line 17—17 in FIG. 15;

FIG. 18 is a fragmentary sectional view of the top portion of a corn popping machine showing the construction of the indexing mechanism for the distributing structure;

FIG. 19 is a sectional view taken along the line 19—19 in FIG. 18;

FIG. 20 is a bottom view of a portion of the corn popping apparatus of the invention showing the heating means and the temperature control means therefor;

FIG. 21 is a sectional view taken along the line 21—21 in FIG. 2;

FIG. 22 is a longitudinal sectional view through another embodiment of metering valve; and FIG. 23 is a fragmentary view taken along line 23—23 in FIG. 22.

Figure 1:
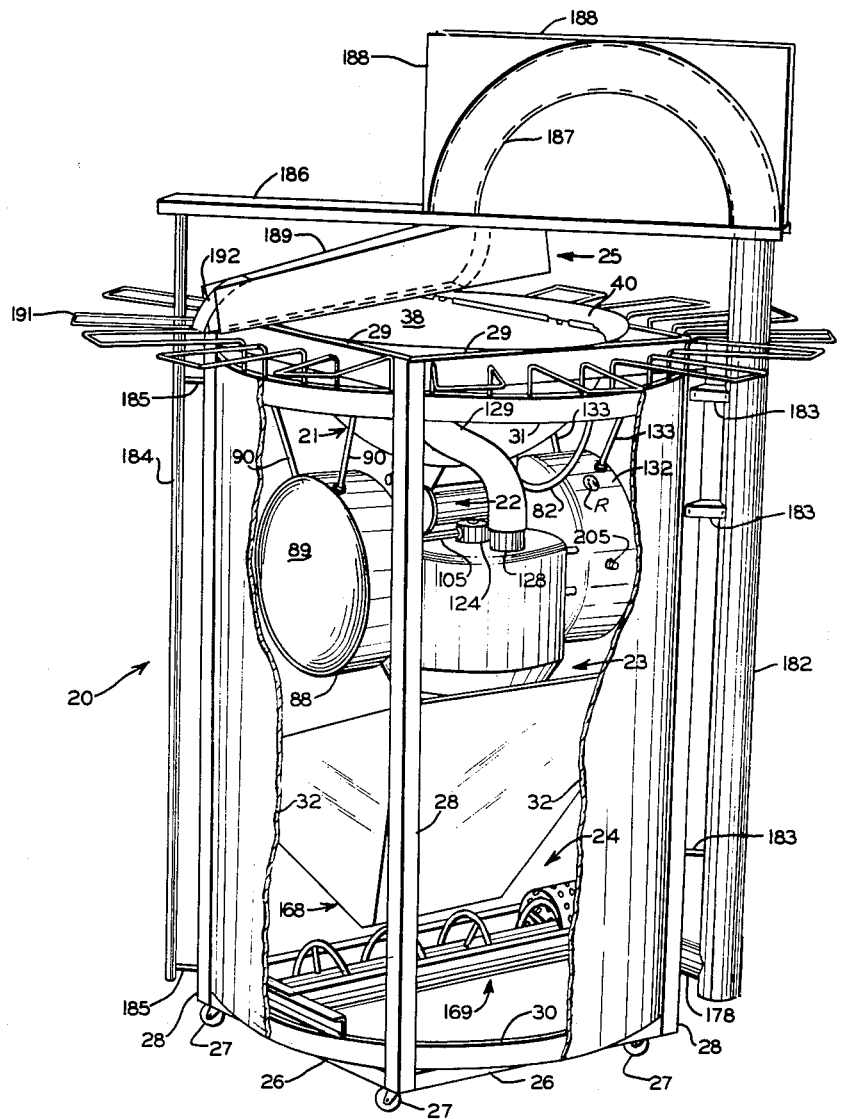
FIG. 1 is a view in perspective of a corn popping machine embodying the invention.

An automatic corn popping machine embodying the invention is designed to be employed at various locations where very substantial quantities of popped corn are needed in the course of a day. The automatic corn popping machine, generally indicated at 20, is shown in FIG. 1 while the various components for this machine are illustrated in FIGS. 2, 3, 7, 15 and 16. More particularly, the corn popping machine 20 comprises a storage portion 21, a feeding device 22, a popping apparatus 23, a delivery section 24, and a distributing structure 25.

Referring now to FIG. 1 the popcorn machine 20 includes a generally rectangular base consisting of four downwardly facing channels 26 that are rigidly connected to one another at their respective ends. A caster 27 is mounted on each corner of the base at the intersection of the channels 26, and these casters 27 enable the popcorn machine 20 to be rolled from one location to another. It will be appreciated, of course, that the automatic corn popping machine 20 embodying the invention may be mounted in a fixed location, say in the lobby of a theater, or it could be mounted in a movable vehicle, such as a truck or wagon, to be transported from one location to another, as for example, in different parts of a recreational park or zoo.

A vertically extending upright 28 is secured to each corner of the base at the intersection of the channels 26 as shown in FIG. 1, and a rectangular support made up of four inwardly turned channels 29 connects the tops of the uprights 28. The channels 29 support both the storage portion 21 and the popping apparatus 23 as shown in FIG. 2.

A lower circular frame 30 is secured to the uprights 28 above the channels 26 while an upper circular frame 31 is secured to the upper end of the uprights 28 below the channels 29 of the upper frame. The circular frames 30 and 31 engage side panels 32 which form a cover or cabinet for the storage portion 21, the feeding device 22, the popping apparatus 23 and the delivery section 24. The panels 32 are generally flexible and are readily snapped into place in engagement with both the circular frames 30 and 31 by means of conventional snap fasteners, not shown, as well as the uprights 28 which are spaced slightly from the frames 30 and 31 to afford entry of the edge portions of the panels 32. Thus the panels 32 may be readily removed from the popcorn machine 20 to facilitate cleaning and repairs. The panels 32 may be translucent, transparent or opaque and may be either smooth or corrugated depending upon the desired appearance of the machine 20.

Referring to FIGS. 1, 2, 3 and 7 the storage portion 21 comprises a hemispherically shaped hopper 33 which is preferably either stamped or spun aluminum for light weight and easy cleaning. The hopper 33 has a peripheral lip 34 (FIGS. 3 and 7) around its edge which engages the channels 29 for support, and the hopper 33 may be readily removed from engagement with the rectangular support formed by the channels 29 for cleaning. The hopper 33 contains a vertically extending partition 35 that is offset from the vertical axis of the hopper 33 as shown in FIG. 7 to form two storage chambers of unequal size. An enlarged chamber 36 contains unpopped kernels of corn and in a typical machine this chamber may store 50 pounds or more of popcorn. The smaller chamber 37 holds a supply of cooking oil, and in a typical machine this chamber may hold two gallons or more of liquid popping oil. If desired, solid oils may be stored in the chamber 37 and heated by a suitable heater H.

A lid 38 is positioned by the top of the partition 35 as shown in FIG. 7 and has a downwardly turned edge 39 which engages the lip 34 to form a sanitary seal around the edge of the hopper 33. Another lid 40 is hingedly connected to the lid 38 as shown in FIG. 1 and has a downwardly turned peripheral edge 41 which engages the lip 34 to prevent the oil in the chamber 37 from becoming contaminated.

As shown in FIGS. 3 and 7, a generally rectangular salt compartment 42 is located in the center of the hopper 33, and this compartment is large enough to contain a supply of fine, prepared, flour salt (popcorn type) sufficient to pop the 50 pounds of corn in the chamber 36, i.e. 3 to 4 pounds. While the lid 38 of the corn chamber 36 prevents contamination of the salt in the compartment 42, a screen 43 is removably mounted on the upper end of the salt compartment 42 to prevent ingress of kernels of corn and large particles of salt thereinto.

The raw popcorn kernels, salt and popping oil are metered into the popping apparatus 23, each by its own metering means contained in the feeding device 22. The popcorn metering means comprises a drum 44 (FIGS. 2, 3 and 7) which is mounted for rotation on a shaft 45. The drum 44 comprises a cylindrical wall 46 and an oil cup 47 which forms an end wall for the drum 44 as well as a metering means for the popping oil. The oil cup 47 is pinned to the shaft 45 for rotation therewith in a manner which will be described later. The cylindrical wall 46 has an axial slot 48 through which kernels of popcorn enter the drum 44 and from which they are emptied when the drum 44 reaches the position shown in FIG. 4 wherein the charge of popcorn is dropped into the popping apparatus 23. The kernels of popcorn are directed to the slot 48 by opposed slanted guides 49 and 50 as shown in FIG. 3. Each of the guides 49 and 50 have inwardly turned end walls which are secured to the ends of the salt compartment 42 to properly position the guides and contain the corn when the compartment 42 is inserted in the opening in the bottom of the hopper 33.

The drum 44 rotates in a clockwise direction (FIGS. 3 and 4) within an arcuate enclosure formed by a partially cylindrical flange 51 which depends from the lower edge of the guide 50, a circular end piece 52 and a collar 53 (FIG. 7). Both the end piece 52 and the collar 53 are secured to the flange 51. The circular end piece 52 has a recess into which the edge of the cylindrical wall 46 fits and which guides the cylinder 44 during its rotation. The collar 53 simply embraces the cylindrical surface of the oil cup 47 at the end of the cylindrical wall 46. Popcorn kernels are retained in the arcuate enclosure by a flexible wiping blade 54 that is secured to the lower edge of the flange 51 and another flexible wiping blade 55 that is attached to the bottom of the guide 49 as shown in FIGS. 3 and 4.

As shown in FIGS. 2, 3 and 7, the popping apparatus 23 includes a skillet 56 with an overlying hood 57 for preventing contamination of the popcorn by the ingress of foreign matter into the skillet 56 during popping. The hood 57 further serves as a shield to prevent the escape of popping corn during the popping operation. A tab 58 extends upwardly from the top wall of the hood 57 and supports the shaft 45, and a longitudinally extending pin 59 on the end piece 52 engages the tab 58 to prevent rotation of the end piece 52. The top of the hood 57 further includes a generally rectangular opening that is normally closed by a hingedly mounted trap door 60 which extends across the hood 57 beneath the popcorn metering drum 44. The trap door 60 has an upwardly extending lever 61 secured thereto as shown in FIG. 4.

A segmentally shaped edge cam 62 is secured to the exterior of the oil cup 47 and protrudes radially therefrom in line with the lever 61 (FIGS. 4 and 7). Abutment of the lever 61 with the raised portion of the cam 62 holds the door 60 closed. As the popcorn drum 44 is rotated, the cam 62 likewise rotates, and shortly after the drum 44 reaches the position shown in FIG. 3 and before it reaches the position shown in FIG. 4 the edge of the cam 62 releases the tripping lever 61 to enable the trap door 60 to swing open by gravity. Further rotation of the popcorn drum 44 moves the cam 62 into engagement with the lever 61 to rotate it in a counterclockwise direction to the position indicated by the dotted lines in FIG. 4 wherein the trap door 60 again closes the gate in the hood 57.

Popcorn in the chamber 36 is carried by gravity downwardly into the bottom of the hopper 33 and into the arcuate enclosure between the flange 51 and the exterior of the cylindrical wall 46. As the drum 44 rotates, popcorn enters the drum 44 through the slot 48 after this slot passes the wiping blade 55, and a filled drum constitutes a metered charge, usually one pound, of popcorn to produce one batch in the popping apparatus 23. As the drum 44 continues to rotate, the cam 62 releases the lever 61 to open the trap door 60 to the position shown in FIG.

4 just prior to the arrival of the slot 48 at the wiping blade 54. Immediately after the slot 48 passes the wiping blade 54, kernels of corn begin to spill downwardly through the slot 48 and to tumble through the opening of the trap door 60 onto the skillet 56. As the drum 44 moves in a clockwise direction beyond the position illustrated in FIG. 4, the cam 62 moves into engagement with the lever 61 thereby swinging the trap door 60 upwardly to the position indicated by the broken lines in FIG. 4 again closing the top of the hood 57.

Salt from the compartment 32 is metered into the popcorn drum 44 after the slot 48 passes the wiping blade 55, and after mixing with the popcorn during the remaining rotation of the popcorn drum 44, the salt is dumped with the corn into the skillet 56. Salt is so metered by a rotating salt drum 63 that is shown in FIGS. 3 to 7, and the drum 63 constitutes a portion of the feeding device 22. The salt drum 63 comprises a tube 64 and two opposed end plugs 65 and 66 as shown in FIG. 7. The tube 64 is axially slotted to form axial openings 67 through which the salt enters the drum 63. The tube 64 rotates in a sleeve 68 fabricated from synthetic rubber or the like, and the sleeve 68 is cemented or otherwise fixed in an outer tube 69 which extends across the bottom of the salt hopper 42 adjacent inwardly turned ends thereof. Flexible guide blades 70 are positioned between and engage the inwardly turned ends 71 and the outer tube 69. Both the tube 69 and the sleeve 68 are slotted at the top and the bottom to form an entry opening 72 and an exit opening 73.

When the salt drum 63 is in the position indicated in FIG. 5 with the opening 67 in alignment with the opening 72 salt flows by gravity out of the compartment 42 into the drum 63, and when the drum 63 is filled it constitutes a metered charge of the appropriate weight for a single popping of corn. A popping of corn will usually be from 3 to 4 pounds. The size of the salt charge is varied by axially shifting the end plug 66. As soon as the slot 48 of the popcorn drum 44 reaches its uppermost position the salt in the salt drum 63 is dumped into the corn drum 44.

In order to dump the salt in the corn drum 44 the salt drum 63 is rotated from the position in FIG. 5 to the position of FIG. 6. Referring now to FIGS. 2 and 21, the salt drum 63 is rotated by a plurality of drive pins 74 on the cam 62 which engage outwardly directed spokes 75 on the end plug 65. Turning the shaft 45 rotates the cam 62 through an angle of 360° during each cycle of the machine, and the position of the pins 74 determines when the spokes 75 are engaged to rotate the salt drum 63. As explained above, this occurs when the opening 48 of the popcorn drum 44 is uppermost (FIG. 6). Engagement of the spokes 75 with the pins 74 rotates the salt drum 63 through an angle of 180° turning its slot 67 downwardly as shown in FIG. 6 to empty the salt drum 63. Immediately thereafter, the last pin 74 on the cam 62 moves out of contact with its respective spoke 75, and the return spring 76 causes the salt drum 63 to be returned to the uppermost position for the receipt of a subsequent charge of salt (FIG. 5). The salt drum 63 and the spokes 75 are returned to the salt receiving position shown in FIG. 5 by a return spring 76 shown in FIGS. 2 and 7. While the rotation of the salt drum 63 from the filling position shown in FIG. 5 to the dumping position shown in FIG. 6 is relatively slow as the drum 63 is rotated by the pins 74 engaging the spokes 75, the return from the position shown in FIG. 6 to the position shown in FIG. 5 under the influence of the spring 76 is extremely fast. The snapping or quick return of the salt drum 63 creates a turbulence in the stored salt in the chamber 42 and prevents the salt from sticking to the walls of the drum 63 while insuring the addition of the proper amount of salt to each batch.

Oil in the proper volume for a single popping charge is metered into the popping apparatus 23 by the oil cup 47 which cooperates with an end bell 77 (FIG. 7) that is mounted circumjacently to the shaft 45 at the side of the oil cup 47 away from the popcorn drum 44 and is pressed against a gasket 78 thereon by a spring 79 that is carried by the shaft 45. An oil tube 80 leads from a fitting on the hopper 33 that communicates with the oil chamber 37 and fits over a nipple that communicates with an upper horizontal bore 81 in the end bell 77 as shown in FIGS. 7 and 8. A transparent gauging tube G which extends upwardly from the end bell 77 along the hopper 33 (FIG. 2) also communicates with the bore 81 to indicate the level of the oil in the chamber 37. The gauging tube 82 also pivots downwardly to drain the chamber 37.

The oil cup 47 has a disc-like end wall through which there is drilled a single axially extending opening 83 that is spaced radially from the shaft 45 a distance such that it aligns with the bore 81 when the cup 47 is turned upwardly into the oil receiving position and aligns with a lower bore 84 in the end bell 77 when the oil cup 47 is rotated 180° away into the oil charging position. An oil discharge tube 85 leads from the end bell 77 through the hood 57 into the popping apparatus 23. The angular position of the opening 83 in the end wall of the oil cup 47 is such relative to the slot 48 of the popcorn drum 44, that the charge of oil is metered into the popping apparatus 23 at a time in the popping cycle preceding the admittance of the popcorn and salt so as to preheat the popping oil.

The shaft 45 which functions to rotate all three of the interlocked metering means of the feeding device 22 to open the trap door 59 for admission of corn and salt into the enclosure 57 is driven by a drive shaft 86 that is selectively pinned thereto as shown in FIG. 7. The shaft 86 is driven by a timing mechanism 87 that is mounted in a housing 88 having a removable cover 89 as shown in FIGS. 1, 2 and 7. The housing 88 is suspended from a channel 29 of the top frame by a pair of hanger rods 90 as shown in FIGS. 1 and 2.

Referring to FIG. 9, the timing mechanism 87 is driven by an electric motor 91 mounted within the housing 88 through a belt 92 that engages a pulley 93 on the motor drive shaft and a pulley 94 on the timing mechanism 87. The pitch diameter of the pulley 94 is adjustable by moving the two halves of the pulley toward or away from one another in order to compensate for changes in voltage which cause the speed of the motor 91 to change when the popcorn machine 20 is moved from one location to another. The pulley 94 is mounted on a shaft 95 that is journalled in a pair of supporting bars 96 in the timing mechanism as shown in FIG. 11, and the shaft 95 drives a worm gear 97 secured thereto which, in turn, rotates a spur gear 98 on a shaft 99. A pinion 100 on the shaft 99 meshes with and turns a spur gear 101 on a shaft 102 which revolves a pinion 103 secured thereto. The spur gear 104 on a shaft 105 is driven by the pinion 103 while a pinion 106 on the shaft 105 rotates a spur gear 107 on the shaft 86 to drive the shaft 45 in the popcorn drum 44.

The gears and pinions are so selected that when the motor 91 is running the spur gear 107 as well as the shaft 86 makes one complete revolution during the time required to pop one batch of popcorn in the popping apparatus 23. In a typical popcorn machine 20 embodying the features of the present invention which is designed to pop the corn in one-pound batches the gear 107 and the shaft 86 make a complete revolution in 3¼ minutes. Consequently the popcorn drum 44 as well as the oil cup 47 of the delivery section 24 make one complete revolution in 3¼ minutes. The shafts 86, 99, 102 and 105 are journaled in spaced plates 108 and 109 as shown in FIGS. 9 and 10, and the back plate 109 is bolted to the rear wall of the housing 88.

Referring to FIGS. 3, 16 and 20, the skillet 56 of the popping apparatus 23 comprises a generally circular pan 110 having a heating element 111 in thermal contact therewith. The pan 110 has outwardly flared sides which surrounds the bottom of the hood 57 in the popping position shown in FIG. 3. A bottom cover 112 encloses the heating element 111 and is secured to the bottom of the pan 110 by a bolt 113 that extends through a centrally disposed hole 114 in the pan 110. A stirring blade 115 is pivotally secured to the center of the pan 110 by the bolt 113, and this blade is rotated during popping to agitate the corn.

An important feature of the invention is the provision of a thermostat 116 on the bottom of the pan 110 within the bottom cover 112 adjacent the heating element 111 as shown in FIG. 20. The thermostat 116 is utilized not only to maintain the skillet 56 at its proper popping temperature, but also it controls the starting of the motor 91 in a manner which will be described later in greater detail to make certain that the skillet 56 has reached the proper popping temperature before the feeding device 22 supplies popcorn, oil and salt to the skillet when the popcorn machine 20 is first started. More particularly, when the popcorn machine 20 is first started the heating element 111 preheats the skillet 56 for approximately four minutes before the motor 91 is started.

Referring now to FIGS. 3 and 16, the skillet 56 is mounted on a horizontally extending shaft 117 by arms 118 that are secured to a pair of tabs 119 on the pan 110 (see FIG. 20). The weight of the skillet 56 is balanced by a counterweight 120 mounted on arms 121 that are secured to the arms 118.

As the kernels are popped in the skillet 56 they are constantly agitated by the blade 115 that is rotated by a downwardly extending rod 122 that is secured to a vertically extending shaft 123 as shown in FIG. 3. The shaft 123 extends upwardly into a generally cylindrical enclosure 124 located in the center of the hood 57 as shown in FIG. 3. The uppermost end of the shaft 123 is threaded, and by tightening a suitable nut 125 thereon a bevel gear 126 mounted on the shaft 123 is moved upwardly into engagement with a mating pinion gear 127 on the end of the shaft 105 (FIG. 2) which carries the spur gear 104 and the pinion 106 in the timing mechanism 87. Thus as the timing mechanism 87 is driven by the motor 91 rotation of the shaft 105 revolves the rod 122 about a vertical axis in a sweeping motion to drive the stirring blade 115. As the rod 122 is rotated to stir the corn, the hood 57 is ventilated by a stack 128 as shown in FIG. 3, and if desired a suitable flexible hose 129 may be attached to the stack 128 as shown in FIG. 2.

The hood 57 is mounted beneath the feeding device 22 by braces 130 that extend from the rear of the housing 88 and opposed braces 131 which extend from a housing 132 that is supported from one of the channels 29 by a hanger rod 133 as shown in FIG. 2. The housing 132 is similar to the housing 88 and has a cover 134. A pointer 135 is mounted outwardly of the cover 134 on a shaft 136 which extends through a suitable counter 137 mounted on a centrally disposed wall 138 in the housing 132. The shaft 136 further extends into a junction box 139 that is mounted on the opposite side of the wall 138. The cover 134 has spaced numbers thereon to form a dial 140 located on a circle generated by the end of the pointer 135, and the desired number of poppings is set on this dial by the pointer 135 when the popcorn machine 20 is placed in operation.

The shaft 117 which carries the skillet 56 extends along one side of the hood 57 and into both the housings 88 and 132 as shown in FIGS. 3 and 7. A tripping arm 141 is pivotally connected to an actuating rod 142 that extends upwardly to contact one tooth of a ratchet wheel on the counter 137, and each time the shaft 117 is rotated to pivot the skillet 56 to effect a dumping thereof the arm 141 moves the rod 142 downwardly below a tooth of the ratchet wheel and then upwardly to move the ratchet wheel one tooth spacing to index the pointer 135 one space on the dial. When the pointer 136 is indexed to zero, the machine 20 is automatically shut off by a cam actuated switch in the junction box 139.

Also extending through the back wall of the housing 132 is a bolt 143 that supports the opposite end of the shaft 45 from the shaft 86. Loosening the bolt 143 enables the feeding device 22 to be removed from the popcorn machine 20 for cleaning and repair.

Referring to FIG. 9, the shaft 117 is rotated about its longitudinal axis to dump the skillet 56 by an arm 144 having its outermost end pinned at 145 to the end of a link 146. The opposite end of the link 146 is pivotally connected to a marginal peripheral portion of a wheel 147 by a pin 148. The wheel 147 is mounted for free rotation on the shaft 102 as shown in FIG. 12.

Axial motion of the wheel 147 along the shaft 102 is limited by opposed snap rings 149 and 150 as shown in FIG. 13, and the wheel 147 is maintained in the position whereby the shaft 117 locates the skillet 56 in the popping position as shown in FIGS. 3 and 7 by a pin 151 as shown in FIGS. 9 and 12. The pin 151 is urged axially towards the periphery of the wheel 147 into engagement with a suitable notch 152 in the edge thereof by a spring 153 which surrounds the pin 151 and is retained in a block 154 that is mounted on the plate 108. The pin 151 is freely slidable within a bore in the block 154, and the spring 153 engages a collar 155 that is secured to the pin 151. The spring 153 is just strong enough to hold the pin 151 in notch 152 to in turn hold the skillet 56 in its popping position until such time as the rotation of wheel 147 by the motor 91 cams the pin 151 out of the notch 152.

While the wheel 147 normally remains stationary a clutch 156 is rigidly secured to the shaft 102 and rotates therewith. The clutch 156 comprises a pair of spaced bars 157 and 158 (FIG. 14) which is rigidly secured to the shaft 102. A pin 159 extends between the bars 157 and 158, and a rod 160 is pivotally mounted in the space between the bars 157 and 158 on the pin 159. The rod 160 is normally positioned between the bars 157 and 158 against a stop 161 (FIG. 13), and the rod 160 is substantially parallel to the bars 157 and 158 in the normal position when the clutch 156 is turning adjacent the stationary wheel 147. However, the clutch 156 is locked in engagement with the wheel 147 when the rod 160 is rotated to an extended position shown in FIG. 13 wherein the end of the rod 160 is received in a radially extending slot 162 in the wheel 147. While in this position the wheel 147 will rotate about the shaft 102 with the clutch 156.

The clutch 156 is actuated from the engaged position shown in FIG. 13 to a disengaged position and vice versa by an actuator 163 that is secured to the shaft 86 and rotates therewith as the spur gear 107 is rotated within the timing mechanism 87. The actuator 163 comprises a bar 164 having one end secured to the shaft 86 and a pair of pins 165 and 166 which extends outwardly from the end of the bar 164 away from the shaft 86.

Near the end of the popping cycle when the popcorn drum 44 has reached the position shown in FIG. 3, the actuator 163 will be in the position shown in FIG. 12. As the clutch 156 rotates, the lead pin 165 engages the tapered end surface 167 of the rod 160 on the side away from the wheel 147 to rotate the rod 160 to the extended position shown in FIGS. 13 and 14. Frictional engagement between the rod 160 and the side shoulder of the slot 162 keeps the rod 160 in the extended position during rotation of the wheel 147. After the clutch 156 has rotated the wheel 147 through one revolution to move the skillet 56 from the popping position shown in FIG. 3 to the dump position shown in FIG. 16 and back again, the actuator 163 has rotated slightly to move the trailing pin 166 in clutch engaging position on the imaginary line connecting the centers of shafts 86 and 102. More particularly, the trailing pin 166 engages the surface 167 on the side toward the wheel 147 to move the rod 160 out of the slot 162. The slot 162 is so located relative to the notch 152 in the peripheral edge of the wheel 147 that the pin 151 engages the notch 152 simultaneously with the disengagement of the clutch 156 with the wheel 147. The gearing shown in FIG. 11 is such that shaft 86 turns by an angle subtended by the pins 165 and 166 when shaft 102 makes one revolution.

As the clutch 156 rotates the wheel 147 to move the skillet 56 to the dumping position shown in FIG. 16, the popcorn falls from the skillet 56 by gravity into a hopper 168 that is supported by the uprights 28. The hopper 168 has a generally rectangualr opening in the bottom thereof which feeds the popcorn into a curved trough 169 as shown in FIGS. 15 and 16. The channels 170 are secured to the opposite ends of the trough 169 and are supported on the lower circular frame 30.

A shaft 171 extends along the trough 169 and one end of the shaft 171 is journaled in a bearing 172 on one of the channels 170 (FIGS. 15 and 17) while the opposed end of the shaft 171 is rotated by an electric motor 173 that is mounted on the other channel 170. A worm feeder 174 is secured to the shaft 171 for rotation therewith, and rotation of the worm 174 moves the popcorn along the trough 169 toward the bearing 172.

A perforated drum 175 surrounds the end of the worm 174 adjacent the end of the trough 169 away from the motor 173. The drum 175 rotates with the worm 174, and as the popcorn is fed along the worm kernels of unpopped corn as well as kernels of insufficient size drop through the perforations in the drum 175 into a suitable receptacle 176.

The kernels of popped corn that do not fall through these perforations are carried to the end of the perforated drum 175 by the worm 174 where they fall by gravity into a slot 177 in a pipe 178 shown in FIGS. 15 and 17. A pair of upwardly directed flanges 179 on the pipe 178 on opposed sides of the slot 177 direct the popcorn into the pipe 178. Movement of the popcorn from the drum 175 is facilitated by an outwardly turned flange 180 on the end thereof.

Air is supplied to the pipe 178 by a power driven blower 181 shown in FIG. 15, and the air stream supplied by the blower 181 moves the individual kernels of popcorn along the pipe 178 to a vertically extending duct 182 that is supported by one of the uprights 28 as shown in FIG. 1. The popcorn moves upward in the duct 182 to the distributing structure 25.

The duct 182 is secured to one of the uprights 28 by braces 183 while a vertically extending rod 184 is secured to the diagonally opposite upright 28 by braces 185. A downwardly turned channel 186 is supported by the duct 182 and the rod 184 at their uppermost ends as shown in FIG. 1.

The popcorn moves from the duct 182 through a suitable opening in the end of the channel 186 through a semicircular duct 187 located between spaced walls 188. A portion of each wall 188 adjacent the duct 187 is preferably transparent so that the animated movement of the popcorn as it is discharged from the upper end of the duct 182 is readily visible by prospective purchasers. The popcorn is discharged from the duct 187 into a movable chute 189 as shown in FIG. 1, and the popcorn is conveyed by the chute 189 to receiving bags 190 (FIG. 2) that are supported by wire loops 191 supported by the upper circular frame 31 as shown in FIG. 1. A deflector 192 in the end of the chute 189 directs the popcorn downwardly into the bag 190.

The end of the chute 189 opposite the deflector 192 is secured to a tube 193 shown in FIGS. 18 and 19. The upper end of the tube 193 has a flange 194 that is received within a suitable opening in the center of the channel 186 for rotation therein. The collar 195 encircles the tube 193 and is spaced from the flange 194 while a gear 196 is mounted on the tube 193 between the flange 194 and the collar 195. The tube 193 is maintained within the central opening in the channel 186 by a plurality of circumferentially spaced supports 197 that are bolted to the underside of the channel 186.

The gear 196 as well as the tube 193 and the chute 189 mounted thereon are turned by a pinion 198 that is secured to a shaft 199 extending through the channel 186 and rotatably carried by a bracket 200 secured to the underside of the bar 186 as shown in FIG. 18. The shaft 199 and the gear 198 are driven by a motor 201 mounted above the channel 186 between the spaced walls 188 (FIG. 18) through a belt 202 that engages a pulley 203 on a motor drive shaft and a pulley 204 on the shaft 199.

In operation, the popcorn machine 20 is rolled to the desired location on the casters 27 and the chambers 36 and 37 in the storage portion 21 are filled with popcorn and oil, while the compartment 42 is likewise filled with salt. A source of electrical power is plugged into a receptacle R in the housing 132 (FIGS. 1 and 2) thereby supplying power to the junction box 139. The pointer 135 is set on the dial 140 opposite the numeral indicating the desired number of poppings, and a heater switch in the housing 132 is then actuated by the counter 137 to supply power to the heating element 111, and the flow of current through the heating element 111 is indicated by a pilot light 205.

After a sufficient time, usually 4½ minutes, the skillet 56 reaches the proper temperature for popping, and the thermostat 116 opens to shut off the current to the heating element 111 as indicated by the pilot light 205. The first opening of thermostat 116 actuates a latching-type relay in the circuit to the motor 91 which starts the timing mechanism 87 thereby turning the shaft 86 to drive the shaft 45 to dump one charge of popcorn, oil and salt into the popping apparatus 23. As the corn is popped in the skillet 56 the shaft 86 continues to rotate and the actuator 163 mounted thereon is likewise rotated to a position slightly in advance of that shown in FIG. 9 prior to dumping of the skillet 56. When the actuator 163 reaches this position a pin 206 engages the actuating arm 207 on a microswitch 208 that is mounted on the plate 108.

Actuation of the microswitch 208 starts the motor 201 (FIG. 18) of the distributing structure 25 thereby causing the shaft 199 to rotate the pinion 198 which drives the gear 196 and chute 189. During the first few degrees of revolution of the shaft 199 a pin 209 secured thereto moves out of engagement with an actuating arm 210 on a single pole double throw microswitch 211. The switch 211 has a first contact that is connected in parallel with the microswitch 208 (FIG. 9) mounted on the timing mechanism 87 and which first contact is opened when pin 209 engages arm 210. Movement of the arm 210 because of its release by the pin 209 causes the first contact of the microswitch 211 to close and energize motor 201 and at the same time open its second contact connected to the motor on the blower 181 and the worm motor 173 to deenergize the worm motor 173 and blower 181.

Continued rotation of the shaft 86 and the actuator 163 to position shown in FIG. 9 moves the pin 206 out of engagement with the arm 207, thereby causing the microswitch 208 to break the first circuit to the motor 201. However, current is now being supplied to the motor 201 through the microswitch 211, and the motor 201 continues to drive the pinion 198 and gear 196.

One complete revolution of the shaft 199 and the gear 198 is sufficient to move the chute along an arcuate path from the center of one wire loop 191 to the center of the next adjacent wire loop, and when the chute 189 is indexed to its next station the pin 209 on the shaft 199 engages the arm 210 and the microswitch 211 to cut off the power supply to the motor 201 thereby stopping the same and cease rotation of the chute 189. At the same time the second contact of switch 211 starts the motor on blower 181 and the worm motor 173.

Subsequent to the actuation of the microswitch 208 by the pin 206 on the shaft 86, the actuator 163 moves to position shown in FIGS. 9 and 12 to actuate rod 160 to lock wheel 147 for rotation with the shaft 102 which swings the shaft 117 and the skillet 56 to the dumping position shown in FIG. 16. Oscillation of the shaft 117 causes the arm 141 (FIG. 7) to engage the actuating rod 142 of the counter 137 to move the pointer 135 to the next numeral along the dial 140 on the face of the cover 134. After the desired number of charges have been popped and the skillet 56 has been dumped, the pointer 135 is moved to the zero position by the counter 137 and the power in the junction box 139 is disconnected.

Figure 24:
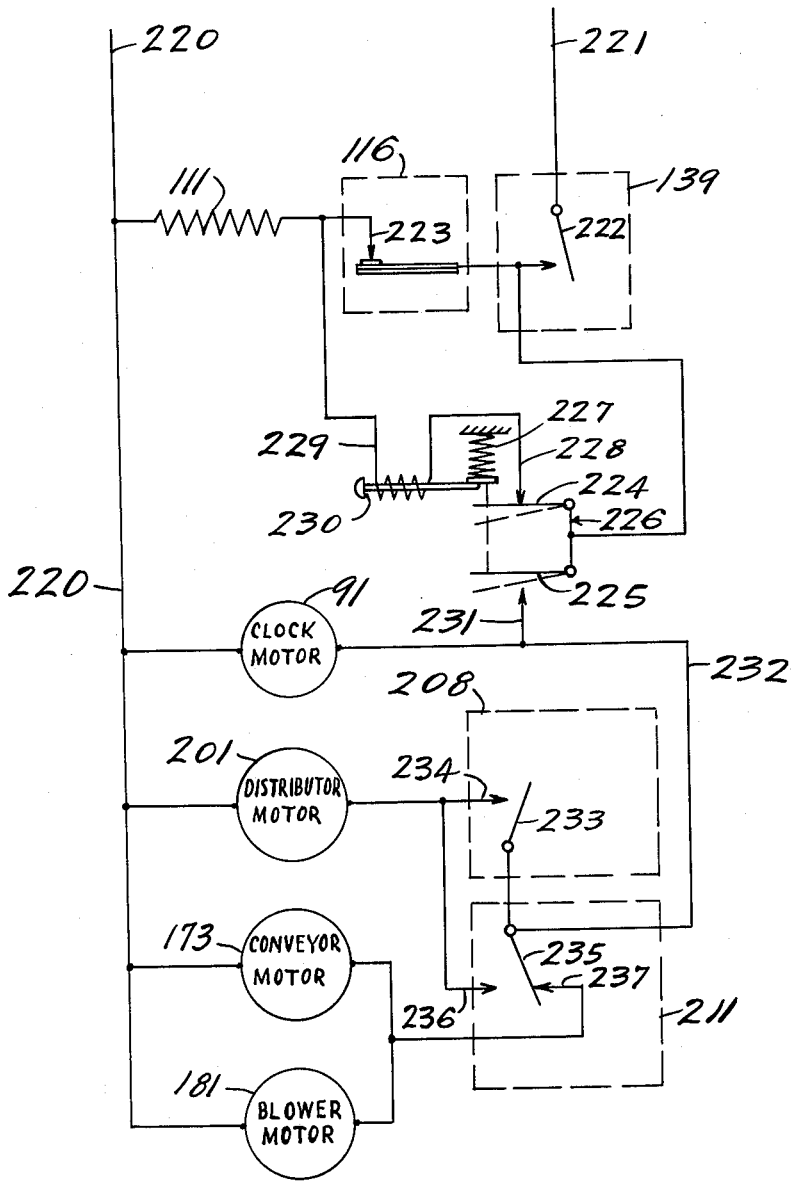
FIG. 24 is a wiring diagram.

The various electrical components which are connected together as above described are shown in FIG. 24. In FIG. 24, 110 volts are supplied between the supply lines 220 and 221. The junction box 139 has a microswitch 222 which is closed by the counter 137 until it is advanced to its zero position by the rod 142 and tooth wheel previously referred to. The thermostat 116 has a switch 223 that is closed below a certain temperature and the switch 223 is connected in series with the heater 111 between the lines 220 and 221. The movable contacts 224 and 225 of a double pole double throw latching switch 226 are connected in series with the switch 222. The movable contacts 224 and 225 are mechanically connected together and are biased toward an unlatched position by a coil spring 227. When the switch is latched, contact 224 engages a contact 228 connected in series with a solenoid coil 229 connected in series with the heater 111. In the latched position of the switch 226, an armature 230 holds spring 227 compressed and the movable contact 224 in engagement with contact 228. The thermostat 116 in effect provides a short across the solenoid 229, and when the thermostat switch 223 opens, a voltage drop occurs across the solenoid 229 which moves the armature 230 and unlatches the latching switch. In the unlatched condition of the switch, contacts 224 and 228 are open, and movable contact 225 engages contact 231 to connect power line 221 with branch power supply line 232. The clock motor 91 is in series between the supply line 220 and branch line 232 so that motor 91 now starts to run. The blade 233 of the switch 208 is connected to the branch supply line 232. As previously indicated, switch 228 is spring biased open and blade 233 is caused to engage its contact 234 when the pin 206 engages the arm 207. The contact 234 is connected to the distribution motor 201 which in turn is connected to the supply line 220.

The switch 211 is a single pole double throw switch having a blade 235 connected to the branch supply line 232. The blade 235 is spring biased toward the contact 236 that is connected in parallel with the contact 234 of the switch 208 and in series with the distribution motor 201. The blade 235 is held open with respect to the contact 236 and into engagement with the contact 237 when the pin 209 engages its actuating arm 210. The contact 237 in turn is connected in series with both the blower motor 181 and the conveyor motor 173 which in turn are connected to the supply line 220.

It will, therefore, be seen that the clock motor 91 will run continuously until the junction switch 222 in the junction box 139 is advanced to its zero setting by the rod 142 after the selected number of corn poppings. Towards the end of each popping, the clock motor 91 causes the arm 207 to close switch 208 and start the distribution motor 201 to move the chute 189 to the next bag support. The switch 208 is only closed momentarily to start the distribution motor 201 which moves pin 209 off of the arm 210 to cause switch 211 to move its contact 235 into engagement with its contact 236 and keep the distribution motor 201 running until the chute 189 reaches the next bag support. Once switch 211 is actuated, the blade 235 moves out of contact with its contact 237 to deenergize the conveyor motor 173 and blower motor 181 while the distributor motor 201 is running to advance the chute 189 from one bag support to the next. When the chute 189 reaches the next bag support, the pin 209 again actuates switch 211 to move its blade 235 out of engagement with contact 236 and into engagement with contact 237 to stop the distribution motor 201 and start the conveyor motor 173 and blower motor 181 to fill the next bag of corn.

The embodiment of valve structure shown in FIG. 22 for metering the various materials to the corn popping chamber is generally similar to that previously described, and differs principally therefrom in that the volumes of each of the salt, raw corn, and oil metering chambers is adjustable, and further in that a unique scraper spring is provided which performs several functions. Those portions of FIG. 22 which are similar to the corresponding portions of the embodiment previously described are designated by a like reference numeral characterized further in that a prime mark is affixed thereto.

The structure shown in FIG. 22 includes a pair of generally parallel spaced apart support plates 250 and 251 having a pair of aligned openings 252 therein which receive sleeve bearings 253 which journal the salt drum 63'. The salt drum 63' is constructed in the same general manner as previously described, and includes the adjustable plug 66' for varying the amount of salt which is charged to the charging drum 44'. The support plates 250 and 251 also include a pair of larger aligned openings 254 which receive a pair of split ring nylon bearings 255 which in turn journal the tubular sidewalls 46' of the charging drum 44'. The charging drum 44' includes one radial wall 256 that is pinned to the tubular sidewalls 46' and is also pinned to the drive shaft 45'. The other radial wall 257 for the corn metering chamber 258, is formed as a wall of a cylindrically shaped plug 259 whose position can be adjusted axially of the charging chamber 258 to vary its volume. The plug 259 has cylindrical sidewalls 260 which have a sliding fit with respect to the inside of the tubular sidewalls 46'. The wall 257 is pressed into one end of the cylindrical sidewalls 260 and a second wall 261 is pressed into the outer end of the sidewalls 260 to close off plug 259.

Salt tends to cake up in the sidewalls of the corn metering chamber 258 due to condensation of moisture coming principally from water vapors liberated from the corn popping chamber. A scraping spring 262 is provided in the chamber 258 to simultaneously scrape the sidewalls of the chamber 258 and force the end wall 257 outwardly of the chamber 258. Axially outward movement of the wall 257 is prevented by a pin 263 which projects out of one side of the plug 259 and is received in the steps 264 of an abutment 265. The steps 264 are arranged so that frictional drag of the revolving drum 44' on the plug 259 forces the pin downwardly against the steps 264, and by locating the pin 263 in various ones of the steps 264, the end wall 257 can be adjusted axially of the chamber 258 to vary its volume. The scraping spring 262 biases the wall 257 axially outwardly to hold the pin 263 on whichever step it is positioned.

The scraper spring 262 can be made in various ways, and as shown in the drawing, has an end portion which is coiled around the shaft 45' and proceeds generally radially outwardly along the adjustable end wall 257 to a pin 266 carried by the wall 257. The spring thereafter wraps around the pin 266 and extends helically in the direction of drum rotation along the sidewalls 46' until it engages the opposite end wall 257 where it extends radially inwardly and is again wrapped around the drive shaft 45'. The adjustable end wall 257 is, of course, held stationary by the pin 263 and abutment 265 and rotation of the drum 44' tends to reduce the diameter of the spring 262 rather than produce a binding force therebetween. The normal diameter of the spring 262, however, is larger than the inside diameter of the drum sidewalls 46' so that it is spring biased against the sidewalls to scrape and remove caked salt from the same. The axial dimension of the spring 262 is also greater than the largest adjusted position of the sidewalls of the chamber 258 so that the spring at all times biases the adjustable sidewall 257 axially outwardly. The opposite ends of the spring are, of course, wrapped around the drive shaft 45' and substantially touch each other so that the ends of the spring also tend to clean the shaft 45' during rotation of the drum.

The oil metering cup 47' can be made in any suitable manner, as for example, by extension of the sidewalls 46' of the metering drum 44'. In the embodiment shown in FIG. 22, however, a shoulder is provided on the radial wall 256 and an extension is provided by a section of tubular Plexiglas 268. The other end of the section of tubular Plexiglas 268 is received in a recess 267 of the cam plate 62', and O rings 269 are provided at opposite ends of the tubular section 268 to provide a seal with respect to the end wall 256 and the cam plate 62', respectively.

Oil is charged to and drained from the oil cup 47' in the same manner previously described. The Plexiglas tube 268 is sandwiched between the cam plate 62' and the wall 256 by a sleeve 270 having a nut 271 at its outer end threaded to the shaft 45'. The spring 79' is positioned between the nut 271 and the end bell 77' to provide sealing pressure to the gasket 78'.

The salt drum 63' is rotated by three pins 75' which are engaged by three pins 74'. Rotation of the cam plate 62, therefore, rotates the salt drum 63' in the same manner as occurs in the previously described embodiment, and after the last pin 74' slides past the last pin 75', the coil spring 76' snaps the drum 63' back to its original position shown in FIG. 22 wherein the stop pin 272 strikes the nylon bushing 273 on an abutment pin 274 carried by the support plate 271. The snap action which occurs between the pins 272 and 274 jars loose salt deposits which may collect periodically in the salt drum. A displacement plug 275 is threaded through the sidewalls of tube 268 and projects into the oil metering chamber to adjust its volume. By using different lengths of plugs 275, the volume of the oil metering chamber can be adjusted to give the desired volume.

While the preferred embodiment of the popcorn machine of the present invention has been illustrated and described, various modifications may be made thereto without departing from the spirit of the invention or scope of the subjoined claims.

I claim:

1. In an apparatus for charging ingredients to a corn popping chamber: a horizontal charging drum having sidewalls positioned around a first axis which extends longitudinally above said popping chamber and having opposite end walls to form a charging chamber, said sidewalls having a longitudinally extending opening therein, a salt drum having longitudinally extending sidewalls positioned above said charging drum and extending around a second axis generally parallel to said axis of said charging drum, a first housing having a salt hopper portion positioned above said salt drum and a bottom portion engaging said salt drum and preventing salt from passing around said salt drum to said charging drum, and the lower portion of said salt drum communicating with the top of said charging drum, said salt drum including end walls forming a salt dispensing chamber having a longitudinally extending opening in its sidewalls which communicates with said salt hopper when its opening is in an upper position, a raw corn hopper positioned above said charging drum, said raw corn hopper having walls which engage and surround at least the upper portion of said charging drum, drive means for revolving said charging drum, said opening of said charging drum communicating with said raw corn hopper and said bottom of said salt drum at different times during rotation of said charging drum, and drive means for rotating said salt drum from a first position wherein the opening of said salt drum communicates with said salt hopper to a second position wherein its opening communicates with said charging drum at a time when said opening of said charging drum is beneath said salt drum to receive salt from said dispensing chamber.

2. In an apparatus for charging ingredients to a corn popping chamber: a horizontal charging drum having sidewalls positioned around a first axis which extends longitudinally above said popping chamber and having opposite end walls to form a charging chamber, said sidewalls having a longitudinally extending opening therein, a salt drum having longitudinally extending sidewalls positioned above said charging drum and extending around a second axis parallel to said axis of said charging drum, a first housing having a salt hopper portion positioned above said salt drum and a bottom portion engaging said salt drum and preventing salt from passing around said salt drum to said charging drum and the lower portion of said salt drum communicating with the top of said charging drum, said salt drum including end walls forming a salt dispensing chamber having a longitudinally extending opening in its sidewalls which communicates with said salt hopper when its opening is in an upper position, a raw corn hopper positioned above said charging drum, said raw corn hopper having walls which engage and surround at least the upper portion of said charging drum, drive means for revolving said charging drum, said opening of said charging drum communicating with said raw corn hopper and said salt drum at different times during rotation of said charging drum, a spring normally biasing said salt drum to a position with its opening communicating with said salt hopper, and drive means operatively connected between said charging drum and said salt drum for rotating said salt drum from a first position wherein the opening of said salt drum communicates with said salt hopper to a second position wherein the opening communicates with said charging drum at a time when said opening of said charging drum communicates with said salt drum to receive salt from said dispensing chamber, said drive means thereafter disengaging to allow said spring to snap said salt drum back to said first position.

3. The apparatus of claim 2 wherein an end wall of said salt drum is movable to vary the salt to corn ratio fed to the popping chamber.

4. In an apparatus for charging ingredients to a corn popping chamber: a horizontal charging drum having sidewalls positioned around a first axis which extends longitudinally above said popping chamber and having opposite end walls to form a charging chamber, said sidewalls having a longitudinally extending opening therein, a salt drum having longitudinally extending sidewalls positioned above said charging drum and extending around a second axis parallel to said axis of said charging drum, a first housing having a salt hopper portion positioned above said salt drum and a bottom portion engaging said salt drum and preventing salt from passing around said salt drum to said charging drum and the lower portion of said salt drum communicating with the top of said charging drum, said salt drum including end walls forming a salt dispensing chamber having a longitudinally extending opening in its sidewalls which communicates with said salt hopper when its opening is in an upper position, a raw corn hopper positioned above said charging drum, said raw corn hopper having walls which engage and surround at least the upper portion of said charging drum, drive means for revolving said charging drum, said opening of said charging drum communicating with said raw corn hopper and said salt drum at different times during rotation of said charging drum, a spring normally biasing said salt drum to a position with its opening communicating with said salt hopper, drive means operatively connected between said charging drum and said salt drum for rotating said salt drum from a first position wherein the opening of said salt drum communicates with said salt hopper to a second position wherein the opening communicates with said charging drum at a time when said opening of said charging drum communicates with said salt drum to receive salt from said dispensing chamber, said drive means thereafter disengaging to allow said spring to snap said salt drum back to said first position, an oil chamber positioned axially of one end of said charging chamber, said oil chamber having an external wall driven with said charging chamber and having an opening therein, a stationary wall in sliding sealing engagement with said wall of said oil chamber having said opening, said stationary wall having an upper opening and a lower opening past which said opening of said oil chamber passes during rotation of said external wall of said oil chamber, an oil reservoir communicating with said upper chamber, and means communicating said lower opening to the popping chamber.

5. A valve for charging ingredients to a corn popping chamber comprising, in combination, a charging drum having a tubular sidewall rotatable around an axis which is positioned above said popping chamber, a pair of end walls in said drum, one of said end walls being slidable axially toward and away from the other of said end walls, means for moving said one end wall axially of said chamber and for restraining said one end wall against rotation, and a coil spring in said chamber in sliding engagement with said tubular sidewall, one end of said spring being retained by said one end wall with the intermediate portion of the spring extending around said sidewall in the direction of drum rotation to scrape said sidewall and the other end of said spring being capable of at least some degree of movement in the direction of drum rotation.

6. A valve for charging ingredients to a corn popping chamber comprising, in combination, a charging drum having a tubular sidewall rotatable around an axis which is positioned above said popping chamber, a pair of end walls in said drum, one of said end walls being slidable axially toward and away from the other of said end walls, means for moving said one end wall axially of said chamber and for restraining said one end wall against rotation, a coil spring in said chamber in sliding engagement with said tubular sidewall, one end of said spring being retained by said one end wall with the intermediate portion of the spring extending around said sidewall in the direction of drum rotation to scrape said sidewall and the other end of said spring being capable of at least some degree of movement in the direction of drum rotation but fixed against axial movement to bias said one end wall apart from said other end wall, and adjustable means for restraining movement of said one end wall away from the other end wall in various axial spacings from said other end wall.

7. In an apparatus for charging ingredients to a corn popping chamber: a charging drum having sidewalls rotatable about a first axis positioned above said popping chamber, a pair of spaced radial walls in said drum cooperating with said sidewalls to enclose a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, and drive means rotating said salt drum in timed relation to rotation of said charging drum to effect transfer of salt to said corn metering chamber.

8. In an apparatus for charging ingredients to a corn popping chamber: a charging drum having sidewalls rotatable about a first axis positioned above said popping chamber, a pair of spaced radial walls in said drum cooperating with said sidewalls to enclose a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, abutment means for limiting rotation of said salt drum from said second position to said first position, spring means biasing said salt drum from said second position to said first position, and drive means rotating said salt drum in timed relation to rotation of said charging drum to effect transfer of salt to said corn metering chamber and to thereafter allow said spring to snap said salt drum back to said first position.

9. In an apparatus for charging ingredients to a corn popping chamber: a charging drum having sidewalls rotatable about a first axis positioned above said popping chamber, a pair of spaced radial walls in said drum cooperating with said sidewalls to enclose a corn metering chamber one of said radial walls being axially movable, first drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, abutment means for limiting rotation of said salt drum from said second position to said first position, spring means biasing said salt drum from said second position to said first position, second drive means rotating said salt drum in timed relation to rotation of said charging drum to effect transfer of salt to said corn metering chamber and thereafter allow said spring to snap said salt drum back to said first position, said second drive means being driven by said first drive means.

10. In an apparatus for charging ingredients to a corn popping chamber: a charging drum having sidewalls rotatable about a first axis positioned above said popping chamber, a pair of spaced radial walls in said drum cooperating with said sidewalls to enclose a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, drive means rotating said salt drum in timed relation to rotation of said charging drum to effect transfer of salt to said corn metering chamber, and a scraper spring having a first stationary portion extending radially along one end wall, an intermediate portion extending helically along said sidewalls in said given direction, and a second end portion capable of at least limited rotational movement extending radially inwardly along the other end wall.

11. An apparatus for charging ingredients to a corn popping chamber: a charging drum having sidewalls rotatable about a first axis positioned above said popping chamber, a pair of spaced radially extending walls in said drum cooperating with said sidewalls to form a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, abutment means for limiting rotation of said salt drum from said second position to said first position, spring means biasing said salt drum from said second position to said first position, drive means rotating said salt drum in timed relation to rotation of said charging drum to effect transfer of salt to said corn metering chamber and thereafter allow said spring to snap said salt drum back to said first position, and a scraper spring having a first stationary portion extending radially along one radial wall, an intermediate portion extending helically along said sidewalls in said given direction, and a second end portion capable of at least limited rotational movement extending radially inwardly along the other radial wall.

12. In an apparatus for charging ingredients to a corn popping chamber: a charging drum having sidewalls rotatable about an axis positioned above said popping chamber, a pair of spaced radial walls in said drum cooperating with said sidewalls to enclose a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a pair of axially spaced radial walls in said charging drum cooperating with the sidewalls to define an oil charging chamber, an oil reservoir above said charging drum, an oil supply conduit from said oil reservoir having an end that is in sealing engagement with the outer side of one wall of said oil charging chamber, a port in the sidewall of said charging chamber communicating said oil supply conduit to said oil charging chamber at one position of said charging drum, a conduit leading to said corn popping chamber and having an end that is in sealing engagement with said outer side of said oil charging chamber, said port communicating said oil charging drum to said corn popping chamber in another position of said charging drum to charge oil to said corn popping chamber in timed relation with respect to corn.

13. In an apparatus for charging ingredients to a corn popping chamber: a charging drum having sidewalls rotatable about a first axis positioned above said popping chamber, a pair of spaced radial walls in said drum cooperating with said sidewalls to enclose a corn metering chamber, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a salt drum positioned above said metering chamber and rotatable about a second axis, a salt hopper positioned above and communicating with an upper part of said salt drum, port means communicating said salt drum with said salt hopper to charge said salt drum when said salt drum is in one position and communicating said salt drum to said corn metering chamber when rotated to a second position, abutment means for limiting rotation of said salt drum from said second position to said first position, spring means biasing said salt drum from said second position to said first position, drive means rotating said salt drum in timed relation to rotation of said charging drum to effect transfer of salt to said corn metering chamber and thereafter allow said spring to snap said salt drum back to said first position, a scraper spring having a first stationary portion extending radially along one radial wall, an intermediate portion extending helically along said sidewalls in said given direction, and a second end portion capable of at least limited rotational movement extending radially inwardly along the other radial wall, a pair of axially spaced radial walls in said charging drum cooperating with the sidewalls to define an oil charging chamber, an oil reservoir above said charging drum, an oil supply conduit in sealing engagement with one wall of said oil charging chamber, and port means in the walls of said oil charging chamber communicating said oil supply conduit to said oil charging chamber at one position of said charging drum and communicating said oil charging drum to said corn popping chamber in another position of said charging drum to charge oil to said corn popping chamber in timed relation to corn.

14. In an apparatus for charging ingredients to a corn popping chamber: a charging drum having sidewalls rotatable about an axis positioned above said popping chamber, a pair of spaced radial walls in said drum cooperating with said sidewalls to enclose a corn metering chamber, one of said radial walls of said corn metering chamber being axially movable, drive means for rotating said charging drum in a given direction about said axis, a raw corn hopper positioned above said charging drum and communicating with an upper wall portion of said corn metering chamber, porting means for charging corn from said raw corn hopper to said corn metering chamber when said charging drum is in one position and for discharging said metering chamber to said corn popping chamber when rotated to a second position, a scraper spring having a first stationary portion extending radially along one radial wall, an intermediate portion extending helically along said sidewalls in said given direction, and a second end portion capable of at least limited rotational movement extending radially inwardly along the other radial wall, said spring biasing said end walls axially apart, and means for limiting movement of said axially movable end wall away from the other end wall.

References Cited by the Examiner

UNITED STATES PATENTS

| | | | |
|---|---|---|---|
| 796,591 | 8/1905 | Martin | 222—142 X |
| 1,296,788 | 3/1919 | Frederick | 222—363 X |
| 1,489,840 | 4/1924 | Lyons | 222—145 |
| 1,516,135 | 11/1924 | Barnard | 99—238.5 X |

(Other references on following page)

UNITED STATES PATENTS

| | | | |
|---|---|---|---|
| 1,540,165 | 6/1925 | Cytron | 222—363 X |
| 1,687,499 | 10/1928 | Johnson | 222—145 |
| 1,945,849 | 2/1934 | Ferrandino | 222—363 X |
| 2,027,698 | 1/1936 | Parks et al. | 99—238.3 |
| 2,181,045 | 11/1939 | Bursnall | 222—363 X |
| 2,194,074 | 3/1940 | Quick | 99—238.7 X |
| 2,687,237 | 8/1954 | Stout | 222—307 X |
| 2,714,473 | 8/1955 | Best | 222—217 X |
| 2,762,528 | 9/1956 | Penfold | 222—132 |
| 2,907,264 | 10/1959 | Bushway | 99—238.3 |
| 3,138,294 | 6/1964 | Coulter et al. | 222—132 |

RAPHAEL M. LUPO, *Primary Examiner.*

WALTER SCHEEL, *Examiner.*

C. I. COUGHENOUR, *Assistant Examiner.*